US008848910B2

(12) United States Patent
Mulcahy

(10) Patent No.: US 8,848,910 B2
(45) Date of Patent: Sep. 30, 2014

(54) HDCP VIDEO OVER USB

(75) Inventor: Luke Mulcahy, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1372 days.

(21) Appl. No.: 12/422,006

(22) Filed: Apr. 10, 2009

(65) Prior Publication Data

US 2010/0260336 A1    Oct. 14, 2010

(51) Int. Cl.
| H04N 7/167 | (2011.01) |
| H04N 21/436 | (2011.01) |
| H04N 21/4408 | (2011.01) |
| H04N 21/41 | (2011.01) |
| H04N 21/4627 | (2011.01) |
| H04N 5/913 | (2006.01) |
| H04N 5/38 | (2006.01) |

(52) U.S. Cl.
CPC ..... *H04N 21/4627* (2013.01); *H04N 21/43615* (2013.01); *H04N 21/4408* (2013.01); *H04N 5/913* (2013.01); *H04N 5/38* (2013.01); *H04N 21/4122* (2013.01)
USPC .......................................... 380/210; 380/200

(58) Field of Classification Search
CPC ..... H04N 7/167; H04N 7/1675; H04N 7/163; H04N 21/4405; H04N 21/2347; H04N 21/23476; H04N 5/38; G06F 13/00
USPC ....................................................... 380/210
See application file for complete search history.

(56) References Cited

U.S. PATENT DOCUMENTS

| 5,692,400 | A | 12/1997 | Bliven et al. |
| 6,049,316 | A * | 4/2000 | Nolan et al. ................. 345/698 |
| 6,583,985 | B2 | 6/2003 | Nguyen |
| 6,668,296 | B1 | 12/2003 | Dougherty et al. |
| 6,885,552 | B2 | 4/2005 | Mullen et al. |
| 6,894,902 | B2 | 5/2005 | Chang |
| 7,142,421 | B2 | 11/2006 | Cheng |
| 7,660,937 | B2 * | 2/2010 | Frantz et al. ................. 710/313 |
| 7,685,322 | B2 * | 3/2010 | Bhesania et al. ................. 710/8 |
| 7,739,745 | B2 * | 6/2010 | Ishimatsu et al. ............... 726/27 |
| 7,856,104 | B2 * | 12/2010 | Douillet ....................... 380/223 |
| 2004/0233620 | A1 | 11/2004 | Doczy et al. |
| 2005/0058434 | A1 * | 3/2005 | Nakashika et al. ............. 386/95 |
| 2005/0123284 | A1 * | 6/2005 | Kikuchi et al. ............... 386/125 |
| 2006/0066438 | A1 | 3/2006 | Altounian et al. |
| 2006/0146042 | A1 * | 7/2006 | Ravichandran et al. ...... 345/211 |
| 2007/0112989 | A1 * | 5/2007 | Iwaki ........................... 710/303 |
| 2007/0209072 | A1 * | 9/2007 | Chen .............................. 726/16 |
| 2007/0220279 | A1 * | 9/2007 | Northcutt et al. ............. 713/193 |
| 2008/0084834 | A1 * | 4/2008 | Stanek ......................... 370/284 |
| 2008/0211216 | A1 * | 9/2008 | Fortin ........................... 280/760 |
| 2009/0125642 | A1 * | 5/2009 | Overby et al. .................... 710/5 |
| 2009/0231485 | A1 * | 9/2009 | Steinke ..................... 348/425.1 |
| 2010/0005289 | A1 * | 1/2010 | Devanand et al. ............ 713/155 |

OTHER PUBLICATIONS

HDCP Specificaion, High-bandwidth Digital Content Protection System revision 1.4 Jul. 2009.*
Espacenet search, Espacenet Result List, Sep. 2011.*

(Continued)

*Primary Examiner* — Jung Kim
*Assistant Examiner* — Shan Elahi

(57) ABSTRACT

A system includes an HDCP-over-USB controller including an HDCP module for encrypting or decrypting video data according to an HDCP standard prior to transmission or display of said video data.

13 Claims, 1 Drawing Sheet

(56) References Cited

OTHER PUBLICATIONS

High-bandwidth Digital Content Protection System Specification Rev.2.x, published Oct. 2008.*
High-bandwidth Digital Content Protection System Rev 1.4, Jul. 2009.*
High-bandwidth Digital Content Protection System Specification Rev.2.0, published Oct. 2008.*
High-bandwidth Digital Content Protection System Specification Rev.1.3, published Dec. 2006.*
HDCP-White Paper, Digital Content Protection for New Home Theater Networking Scenarios, Nov. 2008.*
"Virtualization", Wikipedia article downloaded Jul. 26, 2012, 6 pages.
"Universal Serial Bus", Wikipedia article downloaded Jul. 26, 2012, 31 pages.
"High-bandwidth Digital Content Protection System: Interface Independent Adaptation", Intel Corporation, Oct. 23, 2008, 58 pages.
"High-bandwidth Digital Content Protection", Wikipedia article downloaded Jul. 26, 2012, 6 pages.
"Hdcp USB problem" Tom's Hardware > Forum > Graphics & Displays > Graphics Cards > Hdcp USB problem, (cont) (cont) http://www.tomshardware.com/forum/309682-33-hdcp-problem, 2 pages, entries dated Feb. 16, 2011, downloaded Jul. 26, 2012, 2 pages.

* cited by examiner

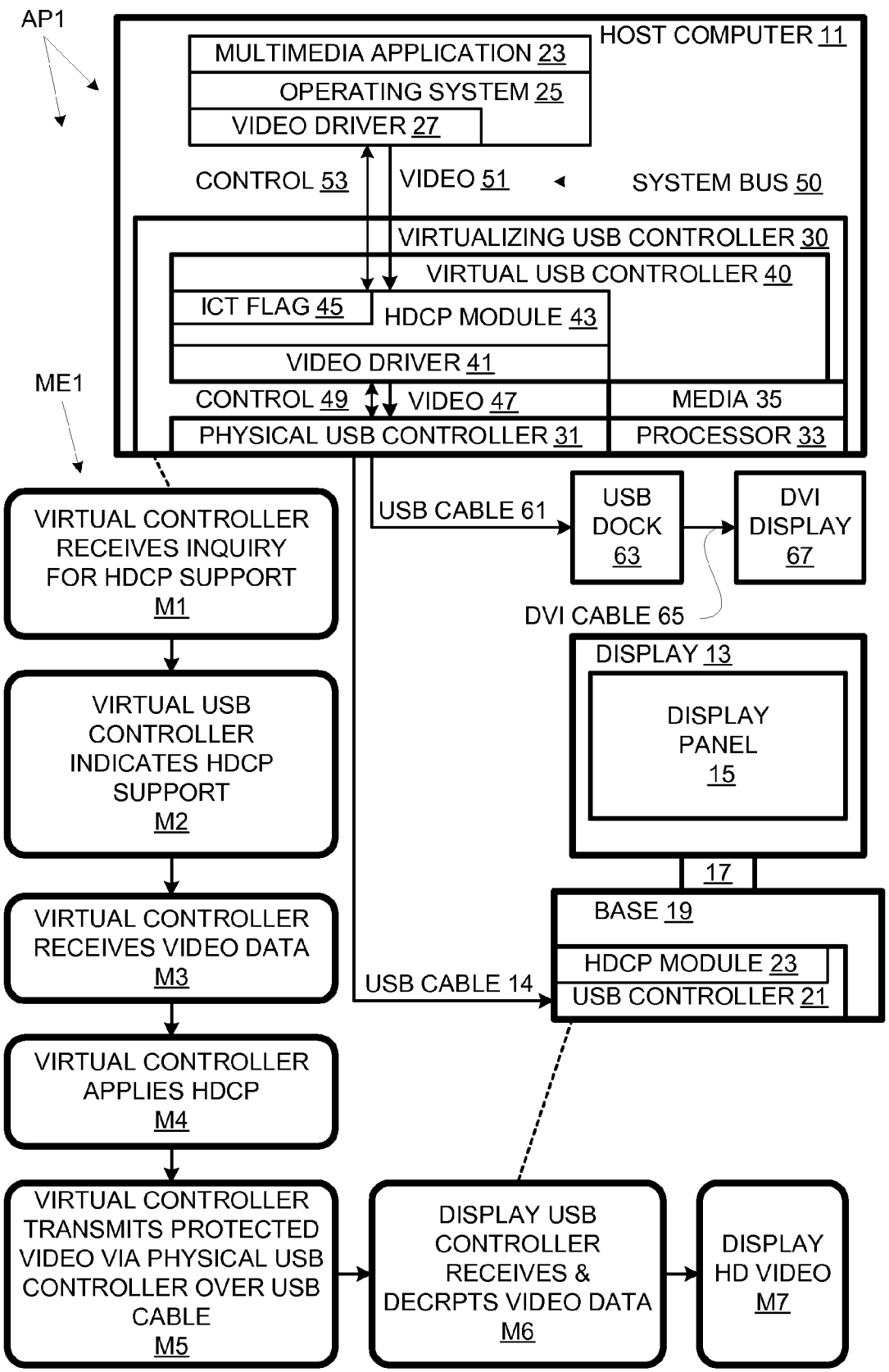

HDCP VIDEO OVER USB

BACKGROUND

Herein, related art is described to facilitate understanding of the invention. Related art labeled "prior art", if any, is admitted prior art; related art not labeled "prior art" is not admitted prior art.

USB displays, i.e., displays that can display video received over a USB ("Universal Serial Bus") connection can be used in many situations where there is no available dedicated video connection, e.g., VGA ("Video Graphics Adapter), DVI ("Digital Visual Interface"), etc. For example, some portable computers have built-in displays, but no external video port; in that case, a USB port can be used to provide a connection to a display that can be larger and more readable than the built-in display. For another example, a user might want to extend the view of an existing display by adding a second display to a computer that only has one dedicated video port. In general, it would be desirable to reduce the number of dedicated ports in favor of more flexible USB ports.

Content providers for HD-DVD and Blu-ray media can set an Image Constraint Token (ICT) flag that will only output full-resolution digital signals using a digital HDCP (High-bandwidth Digital Copy Protection) connection. USB 2.0 has no mechanism for providing HDCP and there is no plan to add one for USB 3.0. Accordingly, the USB Implementers Forum is reportedly working on a USB standard that provides for handling HDCP content.

BRIEF DESCRIPTION OF THE DRAWING

FIG. 1 is a combined schematic diagram and flow chart in accordance with an embodiment of the invention.

DETAILED DESCRIPTION

The present invention provides for HDCP over USB using a virtualizing USB controller that provides a physical USB controller for external communications and a virtual USB controller for communicating with an incorporating host. When the host inquiries whether HDCP is supported, the virtual USB controller responds that it is supported. When a video data is received from the host, an HDCP module on the virtualizing USB controller encrypts the video. The virtualizing USB controller then transmits the encrypted video data out the physical USB port. The virtualizing controller can be used in connection with a USB display with a USB controller that supports HDCP decryption. As a result, HDCP video can be transmitted over a USB cable for display.

As shown in FIG. 1, a computer system API includes a host computer 11 and a display 13 connected to each other by a USB cable 14. Display 13 includes a display panel 15, a stand 17, and a base 19. Base 19 contains a USB controller 21 that supports decryption for HDCP protected video so that HDCP video can be displayed.

Host computer 11 runs a multimedia application 23 on an operating system 25. Operating system 25 includes a video driver 27 that queries a video controller regarding capabilities before transmitting video data. In the case multimedia application 23 is playing HDCP protected content, e.g., playing an HDCP protected Blu-Ray disk, video driver 27 queries whether a video controller supports HDCP encryption. If the controller supports HDCP encryption, video driver 27 provides high-definition video; otherwise, lower-resolution video data is provided that can be sent without protection (which is what would be sent over a conventional USB controller).

Host computer 11 uses a virtualizing USB controller 30 to support the HDCP-over-USB capabilities of display 13. Video driver 27 communicates with controller 30 over a PCI system bus 50, which carries video data 51 as well as control signals and data 53. Controller 30 includes a physical USB controller 31, a processor 33, and computer-readable media 35. Media 35 is encoded with a virtual USB controller 40, which includes a video driver 41 for physical USB controller 31, an HDCP module 43, which in turn provides an "Information Constraint Token" flag 45. Video driver 41 provides video data 47 and control signals and data 49 compatible with physical USB controller 41.

Virtualizing USB controller 30 supports a method ME1, flow charted in FIG. 1. At method segment M1, virtual controller 40 receives an inquiry from video driver 27 regarding the capabilities of virtual controller 40. Based on the set status of ICT flag 45, controller 40 returns an indication that HDCP is supported at method segment M2. Virtual controller 40 receives video data from multimedia application 23 at method segment M3, which it attempts to transmit. At method segment M4, HDCP module 43 applies HDCP encryption to the video data to yield encrypted video data. If there is no inquiry at method segment M1, HDCP module 43 leaves the video data unencrypted. At method segment M5, video driver 41 transmits the encrypted video data via physical USB controller 31. At method segment M6, display USB controller receives and decrypts the video data. At method segment M7, display 13 presents decrypted video at panel 15.

If physical controller 31 had been directly coupled to system bus 50, it would have responded to the inquiry of method segment M1 that it did not support HDCP. In that case, the video signal at 51 would have been relatively low-resolution (non-HD) data, which would have been transmitted unencrypted to display 13. When video driver 41 inquires about HDCP capability, physical USB controller 31 will not indicate that HDCP is supported. Of course, since HDCP module 43 has encrypted the video it has received, the video can be transmitted by physical controller 31 without further encryption and still be HDCP compliant.

Physical USB controller 31 supports a second channel to which a USB cable 61 is connected. In this case, the destination is a USB dock 63, which converts the received encrypted HD video data for transmission over a "Digital Video Interface" DVI cable 65 to a display 67. In this case, display 67 does not have a USB connection or provide for HDCP over USB. Thus, virtualizing USB controller 30 provides for HDCP on a non-USB display or a USB display that does not support HDCP over USB.

In an alternative embodiment, a video driver of a virtualizing controller does not inquire regarding HDCP support. Depending on the embodiment, a virtualization controller can support only one or, alternatively, one or more displays. Also, the host computer may support another display through a dedicated video port. These and other variations upon and modifications to the illustrated embodiment are provided by the present invention, the scope of which is defined by the following claims.

What is claimed is:

1. A system comprising an HDCP-over-USB USB controller to transfer High-Bandwidth Digital Content Protection (HDCP) over a Universal Serial Bus (USB), said HDCP-over-USB USB controller including a physical USB controller and a virtual USB controller, said virtual USB controller including an HDCP module for encrypting or decrypting video data according to an HDCP standard prior to transmission or display of said video data, said virtual USB controller including a controller video driver, said virtual USB controller providing for:

responding to the video driver by affirming a capability for HDCP encryption;

in response to receiving unencrypted high-definition video data, applying HDCP encryption to said unencrypted video data to yield HDCP-encrypted video data; and transmitting said HDCP-encrypted video data over a USB cable via said physical USB controller that does not provide for HDCP encryption, said virtual USB controller communicating with said physical USB controller using said controller video driver.

2. A system as recited in claim 1 further comprising a display panel, said HDCP module decrypting encrypted video data for presentation on said display.

3. A system as recited in claim 1 further comprising a display that supports HDCP-over-USB, said display being connected to said HDCP-over-USB USB controller via said USB cable.

4. A system as recited in claim 1 further comprising a USB dock connected to said HDCP-over-USB USB controller via said USB cable.

5. A system as recited in claim 4 wherein said dock is connected to a display that does not support HDCP-over-USB by a non-USB cable.

6. An HDCP-over-USB method comprising:

receiving an inquiry for High-Bandwidth Digital Content Protection (HDCP) support;

in response to said receiving, a virtual Universal Serial Bus (USB) controller affirming a capability for HDCP encryption;

receiving unencrypted high-definition video data;

applying HDCP encryption to said video data to yield HDCP-encrypted video data;

communicating with a physical USB controller using a controller video driver; and transmitting said HDCP-encrypted video data over a USB cable via a physical USB controller that does not provide for HDCP encryption.

7. An HDCP-over-USB method as recited in claim 6 further comprising:

a third USB controller decrypting said HDCP-encrypted video data to yield decrypted video data; and displaying video represented by said decrypted video data.

8. A Universal Serial Bus (USB) controller comprising:

a virtual USB controller for interfacing with an operating-system video driver of an operating system so as to confirm High-Bandwidth Digital Content Protection (HDCP) support, said virtual USB controller providing HDCP encryption to video data received from said operating-system video driver to yield HDCP-encrypted video data, said virtual USB controller including a controller video driver, said virtual USB controller providing for:

responding to said operating-system video driver by affirming a capability for HDCP encryption;

in response to receiving unencrypted high-definition video data, applying HDCP encryption to said video data to yield HDCP-encrypted video data;

communicating with a physical USB controller using said controller video driver; and transmitting said HDCP-encrypted video data over a USB cable via said physical USB controller that does not provide for HDCP encryption;

said physical USB controller being coupled to said virtual USB controller for transmitting said HDCP-encrypted video data over a USB cable.

9. A USB controller as recited in claim 8 wherein said virtual USB controller includes an HDCP module to encrypt video data to HDCP-encrypted video data.

10. A USB controller as recited in claim 8 wherein said virtual USB controller communicates with said operating-system video driver via a Peripheral Component Interconnect (PCI) bus.

11. A USB controller as recited in claim 8 wherein said virtual USB controller includes an Image Constraint Token (ICT) flag.

12. A USB controller as recited in claim 8 wherein said video data received from said operating-system video driver is unencrypted.

13. A system as recited in claim 1 wherein said encrypting is of unencrypted video data received by said virtual USB controller.

* * * * *